Dec. 13, 1966   W. D. CURTIS ETAL   3,291,033
AUTOMATIC COFFEE BREWING MACHINE
Filed Aug. 15, 1963   3 Sheets-Sheet 1

INVENTORS
WILBUR D. CURTIS
THOMAS M. LOWRY
Huebner & Worrel
ATTORNEYS.

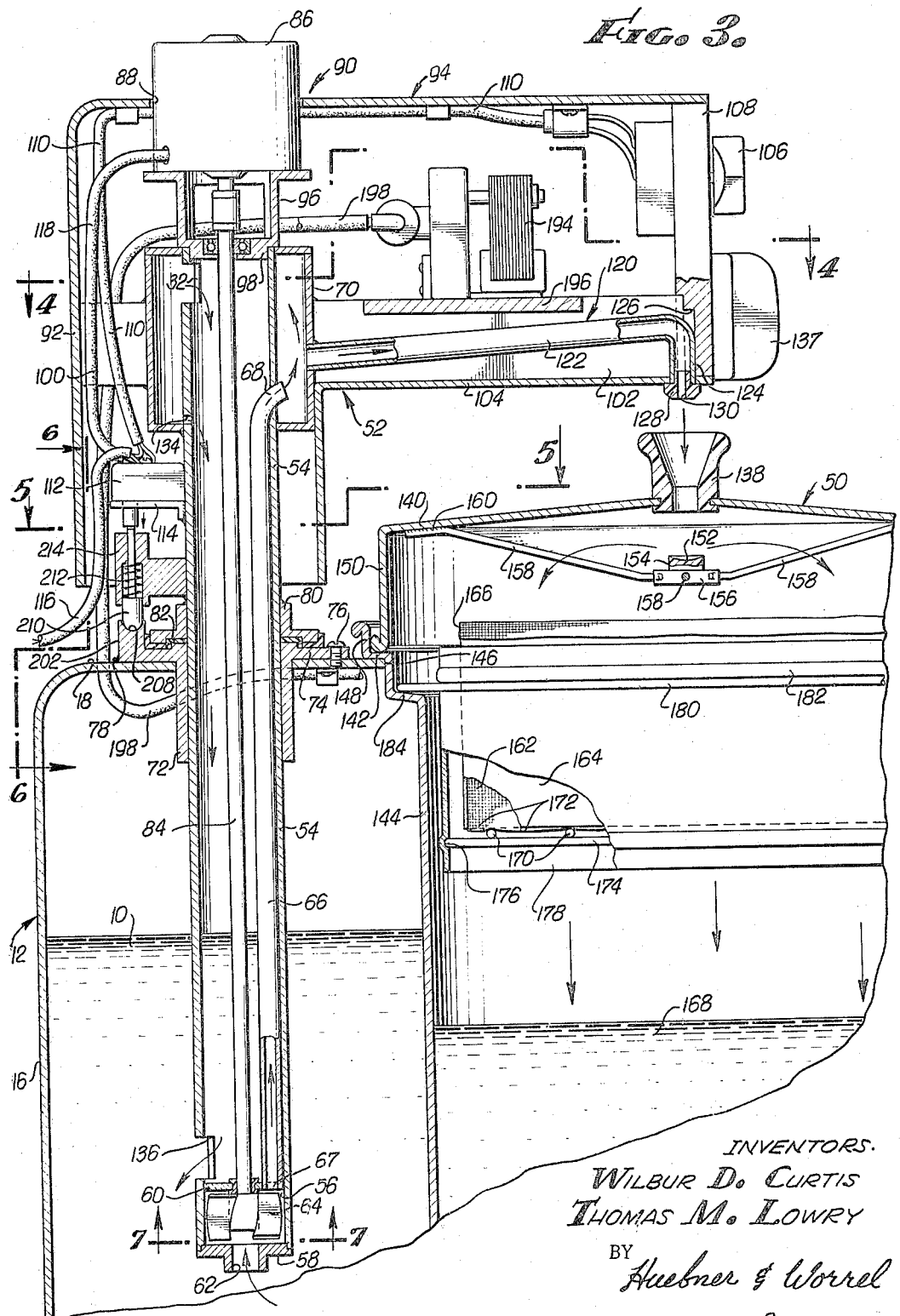

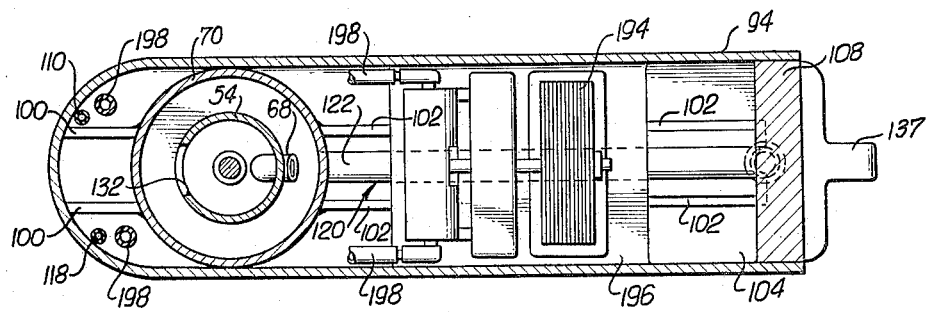
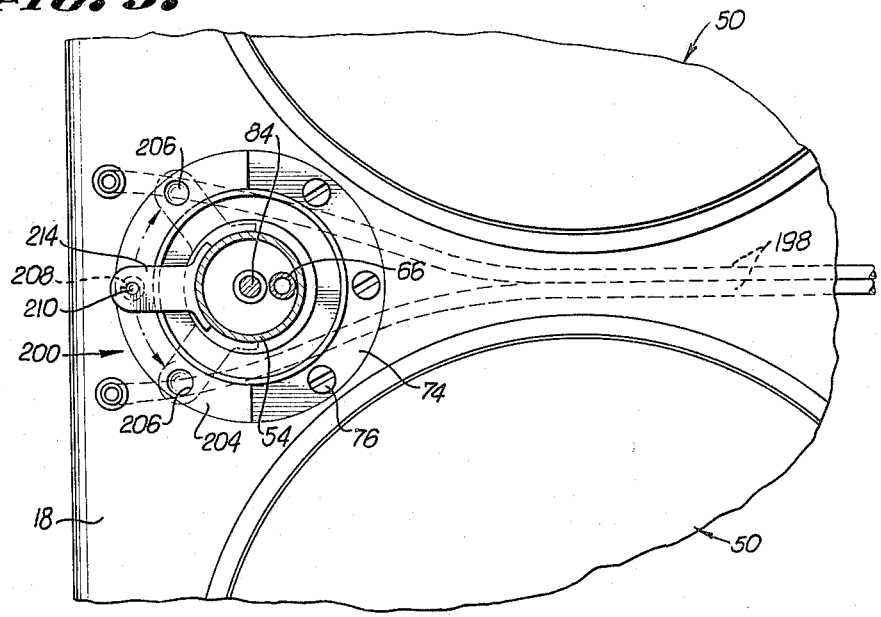
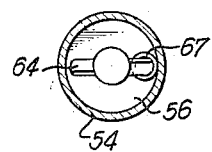
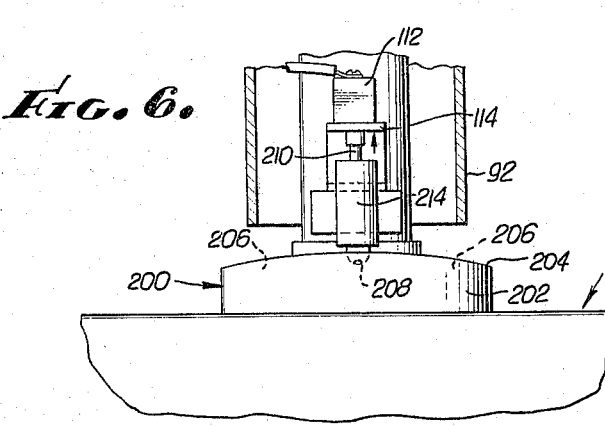
INVENTORS.
WILBUR D. CURTIS
THOMAS M. LOWRY
BY
Huebner & Worrel
ATTORNEYS.

United States Patent Office 3,291,033
Patented Dec. 13, 1966

3,291,033
AUTOMATIC COFFEE BREWING MACHINE
Wilbur D. Curtis, Encino, and Thomas M. Lowry, Pico Rivera, Calif., assignors to Curtis Automatics, Inc., Los Angeles, Calif., a corporation of California
Filed Aug. 15, 1963, Ser. No. 302,345
21 Claims. (Cl. 99—283)

This invention relates to machinery for preparing beverages, and more particularly to machinery that automatically brews coffee.

An object of this invention is to provide a machine for brewing coffee that is fully automatic and which includes an automatically operated water pump that repeatably pumps substantially exactly the same quantity of hot water to ground coffee to produce brewed coffee having consistently the same flavor and aroma.

Another object of this invention is to provide a fully automatic coffee brewing machine of the character described wherein the hot water applied to the ground coffee is poured over the coffee grounds from a gravity feed tank so as to produce true drip coffee, the water poured over the coffee grounds being completely independent of water line pressure variations or flow control valves which interfere with dependable operation of prior art automatic coffee brewing machines.

It is also an object of the present invention to provide an automatic coffee brewing machine of the character described wherein an electrically actuated pump pumps hot water from a hot water tank into the gravity feed tank for a period of time controlled by an accurate and dependable time switch, the pump providing more than the required amount of hot water to the gravity feed tank during its cycle of operation and the excess pumped water overflowing out of the gravity feed tank so that water level and pressure head are constant during most of the cycle during which hot water is poured over the coffee grounds.

A more specific object of this invention is to provide a fully automatic coffee brewing machine of the character described wherein a plurality of ground coffee containers are available to receive a measured quantity of water from a swingable pouring spout and when one container is out of operation the spout may be swung over another container so that coffee may be brewed without interruption.

Another specific object of this invention is to provide a fully automatic coffee brewing machine of the character described wherein the switch is automatically opened to de-energize the electric pump when the pouring spout is being transferred from one ground coffee container to another to insure against the pumping of water and the passing of water from the pouring spout.

Another object of this invention is to provide a fully automatic coffee brewing machine of the character described wherein water is heated and pumped to ground coffee without there occurring any appreciable loss in the temperature of the heated water. For maximum extraction of the best flavors and aromas from the ground coffee it is necessary to supply the hot water to the ground coffee at a temperature close to about 210° F., which the present invention does, whereas in prior art automatic coffee brewing machines the temperature typically goes below 200° F., and in conventional commercial drip coffee urns the manual pouring of the water typically reduces the temperature to below about 205° F.

These and other objects and advantages of the present invention will become apparent from the following detailed description when taken in conjunction with the appended drawings wherein:

FIG. 3 is an enlarged, fragmentary vertical section taken on line 3—3 of FIG. 2;

FIG. 4 is a horizontal section taken on irregular line 4—4 of FIG. 3;

FIG. 5 is a fragmentary horizontal section taken on irregular line 5—5 of FIG. 3;

FIG. 6 is a fragmentary vertical section taken on irregular line 6—6 of FIG. 3; and FIG. 7 is a fragmentary horizontal section taken on line 7—7 of FIG. 3.

Figure 1:
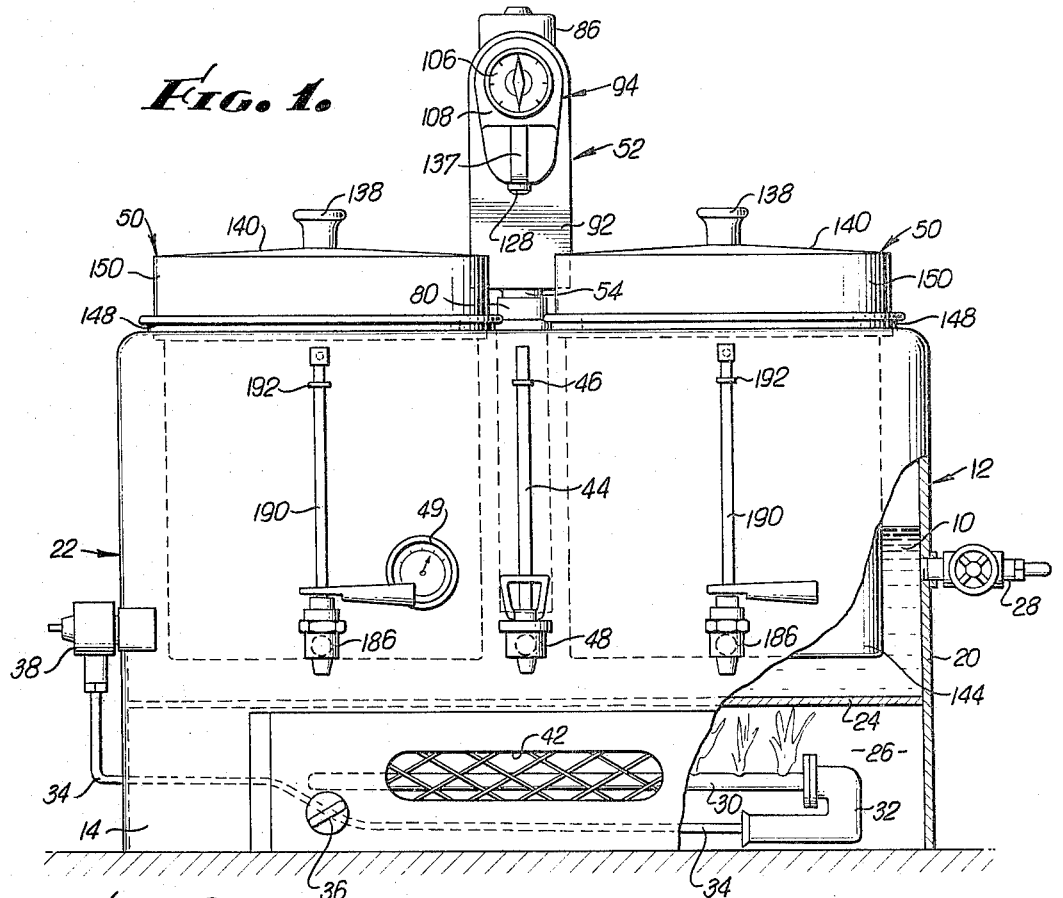
FIG. 1 is a front elevational view of a coffee brewing machine, parts being broken away to disclose details of construction.
Figure 2:
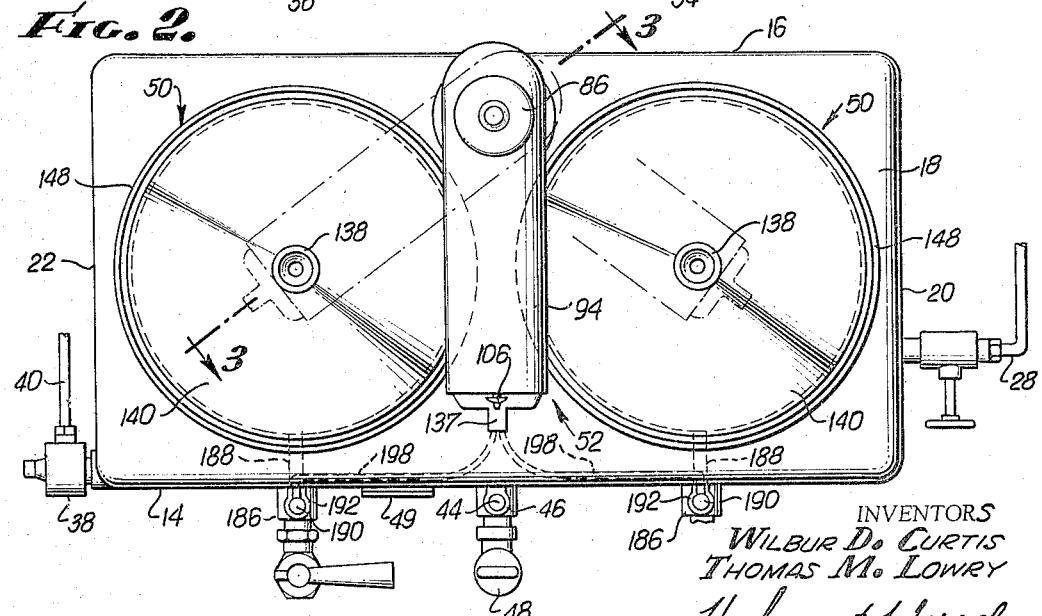
FIG. 2 is a top plan view illustrating and having embodied therein the present invention; movable equipment being shown in solid as well as phantom lines.

Referring initially to FIGS. 1 and 2 of the drawings, water 10 is heated in a vessel 12 which includes a front wall 14, a back wall 16, a top wall 18, a pair of end walls 20 and 22 and a bottom wall 24. The bottom wall, in cooperation with the end, front and back walls, defines a chamber 26 therebelow. Water is introduced into vessel 10 through valve controlled water supply line 28 which is secured to end wall 20.

Heat for the water is supplied by one or more gas or liquid fuel burners 30, only one being shown. Connected to the burner is a manifold 32, and a fuel supply line 34 with a valve 36 therein admits fuel into the manifold. Secured to end wall 22 and connected to the fuel supply line 34 is a fuel safety cut-off valve 38, and fuel to the safety cut-off valve originates in line 40. The operation of burner 30 may be viewed through an opening 42 in front wall 14.

The level of the water 10 in vessel 12 may be determined by referring to sight glass 44 which is secured in a vertical position to the front wall 14 by bracket 46. Withdrawal of water from vessel 12 may be made by a valve 48 also secured to front wall 14 and also in communication with sight glass 44. The temperature of the water 10 in vessel 12 is determined by thermometer 49 mounted on front wall 14.

Water is conveyed from vessel 12 to one of two substantially identical container units 50 by a pumping unit broadly designated 52, the container units and pumping unit to be hereinafter described in greater detail. Since the container units are substantially identical, it is to be understood that a description of one also applies to the other and although only a pair of container units 50 are shown, it is to be further understood that more than a pair of container units may be utilized.

The pumping unit 52, illustrated in detail in FIG. 3, is pivotally mounted adjacent back wall 16 and midway between end walls 20 and 22. The pumping unit 52 embodies an elongated cylindrical column 54 which pivots about its axis and which has the lower or bottom portion thereof submerged in the water 10. The extreme lower end of the column includes a compartment 56 defined by a cap 58, a plate 60 vertically spaced from the cap, and the wall of the column. Admission of water into compartment 56 is through an opening 62 in the cap 58.

Rotatable in compartment 56 is a propeller 64 that serves to propel or transfer the water from the compartment through a substantially vertical water supply tube 66. The water supply tube, located within column 54, is supported at its lowermost end 67 by plate 60. The uppermost arcuate end 68 of tube 66 projects through and is supported in an opening in the wall of column 54. Water from tube 66 is deposited in a cylindrical reservoir 70.

Vertical support for column 54 is supplied by a column embracing sleeve 72 which includes an annular flange 74 supported on the top wall 18 and secured thereto by suitable means, as by fasteners 76 and welding 78. Submergence of the lower portion of column 54 in the water is governed by a collar 80 which is welded to the column and supported on the annular flange 74. Between flange 74 and collar 80 is a gasket 82 that provides a moisture seal.

Power to rotate propeller 64 is provided by an electric motor 86 which is connected to the propeller by an elongated vertical shaft 84. The shaft 84 is centrally located in column 54, and supported in its vertical position by plate 60.

The motor 86 projects through an opening 88 in an L-shaped housing 90 which includes a vertical leg 92 and a horizontal arm 94, and which is swingable about the axis of column 54 in a manner to be hereinafter described. Support for the motor is provided by a motor base 96 which rests on reservoir 70, and the base 96 includes a hub 98 which extends into the column 54.

The reservoir 70 is supported in vertical leg 92 by a pair of spaced-apart, parallel plates 100 which are welded to the reservoir and the internal wall of leg 92, see FIG. 4. Additional support for reservoir 70 is provided by a pair of parallel plates 102 which project into horizontal arm 94 and rest on the lower wall 104 thereof.

The quanity of water entering and leaving reservoir 70 is determined by the length of time motor 86 is permitted to operate, and the length of operation of the motor is determined by a timing or metering switch 106 supported by front wall 108 of horizontal arm 94. The setting of switch 106 is transmitted through electrical leads 110 to a switch 112 secured to a bracket 114 which is welded to column 54. Switch 112 is connected to a source of power, not shown, by electrical lead 16 and is connected to motor 86 by electrical lead 118. Additional operation of switch 112 will hereinafter be developed in greater detail.

Therefore, it may be seen that the timing switch 106 will serve, in part, to control the exact quantity of water that is delivered to the container units 50. Additionally, because there is always an excess quantity of water in vessel 12, the quantity of water delivered to container units 50 is not affected by the pressure of water withdrawn from the water line which contributes water to supply line 28.

Water leaving reservoir 70 is conveyed to container units 50 by an L-shaped water delivery tube 120 which is substantially centrally disposed between plates 102 and which includes an upwardly inclined leg 122 and a downwardly-bent or vertical leg 124. The delivery end of leg 124 projects through the lower wall 104, and the front wall 108 has a recess 126 therein to accommodate leg 124. The delivery end of leg 124 has a plastic insert 128 therein, preferably composed of Teflon, which may have any size orifice 130 considered desirable, but the size of the orifice preferably ranges between about 1/8 to about 1/2 inch in diameter, and it is preferred that the orifice size be between about 1/4 and about 3/16 inch.

When the quantity of water delivered to reservoir 70 exceeds the capacity, a large overflow opening 132 in the uppermost end of column 54 provides gravity flow means for conveying water back to vessel 12. Column 54 also has a drain opening 134 therein that is in communication with reservoir 70 and is employed to drain the reservoir when the pump is not in operation. The lowermost end of column 54 has an opening 136 therein that permits water therein to pass therefrom and into the vessel 12.

The entire pumping unit 52 which rests on flange 74 may be lifted from the vessel 12 for cleaning, repair, or the like, if desired.

When horizontal arm 94 is swung by handle 137 on front wall 108 to one of the dotted line positions illustrated in FIG. 2, the insert 128 is in alignment with a funnel 138, preferably made of plastic or ceramic, which is adapted to receive the hot water from the insert. The funnel is centrally secured to a lid or cover 140 of a container unit 50. The cover rests on an annular flange 142 of a cylindrical coffee kettle 144 and the kettle, which extends into vessel 12 through an opening 146, is removably supported on top wall 18 by the aforementioned flange 142. The lower portion of the kettle is submerged in the hot water 10 and brewed coffee in the kettle is maintained hot by the surrounding hot water. Integral with flange 142 is an upwardly extending or vertical annular rim 148 that circumscribes a portion of cylindrical skirt 150 of the cover 140 to secure the cover in its operative position.

The stream of water passing through the funnel 138 strikes a concave depression 152 formed in a disc 154 and is diffused in a fine spray or fountain. The disc is mounted on a base 156 which is supported by the legs 158 of a spider and the ends of the legs remote from the base 156 are secured to cover 140 as at 160.

The fountain or spray of water is distributed over ground coffee, not shown, deposited in a mesh or porous bag 162 which is located within cylindrical container 164. The mesh bag has its uppermost end folded back over the edge of container 164 as at 166.

Both ends of container 164 are open to admit water to pass into bag 162 and to permit brewed coffee 168 to pass therefrom and into kettle 144.

The bottom of the mesh bag 162 rests on a plurality of parallel, spaced rods 170, and when coffee and water are in the bag a series of pockets 172 are formed between the rods and from these pockets brewed coffee emerges.

Support for container 164, bag 162 and rods 170 is provided by a plurality of rods 174, only one being shown, that are perpendicular to rods 170. The ends of rods 174 are received in an annular channel 176 formed adjacent the lowermost end of a cylindrical container 178. Container 178, which has both the upper and lower ends open, circumscribes container 164 in spaced relation thereto.

Support for container 178 in kettle 144 is provided by a pair of rods 180, only one being shown, which are tangentially arranged with respect to the container and upon which an annular bead 182 of the container rests. The ends of rods 180 rest upon and are supported by an upwardly facing, annular shoulder 184 formed in the kettle.

It is to be understood that the nested containers 164 and 178, the rods associated with each of the containers and the bag 162 are all removable from the kettle 144, and as previously stated, kettle 144 is removable from vessel 12.

Hot brewed coffee may be withdrawn from each kettle by a manually operated valve 186 which is mounted on front wall 14 and which is in communication with the respective kettle through a pipe nipple 188. In order to determine the quantity of brewed coffee in each kettle, a sight glass 190 is in communication with each pipe nipple, and each sight glass is supported in a vertical position by a bracket 192.

The flavor and aroma of the brewed coffee is enhanced by aeration which is accomplished by a small, electrically operated air compressor 194 which is mounted on a base plate 196. The base plate spans the distance between and is supported by plates 102. A pair of air conduits 198 are connected to the air compressor and each of the conduits conveys air to one of the valves 186. When valves 186 are opened to permit coffee to pass therefrom, the coffee is at that time aerated.

So that water will only be pumped when the horizontal arm 94 is in one of the two pouring positions as indicated by the dotted lines in FIG. 2, and to prevent the pumping of water while horizontal arm 94 is in the solid line position illustrated in FIG. 2, or while the arm is being swung from the solid line position to either of the dotted line positions, or from one dotted line position to another, a mechanical safety cut-off 200 for switch 112 is provided, best seen in FIGS. 3, 5 and 6. This safety cut-off comprises an arcuately shaped cam block 202 (FIGS. 5 and 6), which is integral with annular flange 74, and the length of cam block 202 is in direct ratio to the arc of travel defined by insert 128 when arm 94 travels from one dotted line position to another.

The cam block 202 has an upper surface 204 that has a uniform simple curve formed thereon, and in the surface is a pair of spaced detents 206. At the crest or crown of the curved surface and between detents 206 is another detent 208. Each of the detents is adapted to receive a plunger 210 that is biased toward surface 204 by a spring 212. Plunger 210 is supported in a vertical position by a bracket 214 which is welded to column 54. Plunger 210 is also connected to switch 112 and is employed to open the switch when the insert 128 is not aligned with a funnel 138, but to close the switch 112 when the insert 128 is aligned with either of the funnels 138.

The detents and plunger also serve to stop the swing of arm 94 in the proper position whereby the insert 128 is in one of the dotted line positions of FIG. 2, aligned with one of the funnels 138, or the arm 94 is in the central position illustrated in solid lines in FIG. 2.

A brief description of the operation of safety cut-off 200 and switch 112 follows: Assume arm 94 to be in the solid line position illustrated in FIG. 2, the plunger 210 is receivable in detent 208 which is the most elevated of the three detents, and with the plunger in this position, switch 112 is open. Therefore, the setting of meter switch 106 will not serve to close switch 112 and the pumping unit 52 is incapable of operating.

When arm 94 is swung from the solid line position to the right or left to a dotted line position, illustrated in FIG. 2, the plunger 210 is cammed out of detent 208 and onto the upper surface 204. As the arm 94 is swung, the plunger travels down surface 204 until it drops in one of the detents 206. With the plunger 210 in one of the detents 206, the switch 112 is set to operate and may be closed if meter switch 106 has been previously set. The setting of meter switch 106, if not previously set, serves to energize the motor 86 and water is pumped to one of the container units 50. Since the water is not exposed to the cooling atmosphere except for a very short period of time, there is no material loss in the temperature of the water.

Expiration of a period of time determined by the setting of switch 106 will serve to open switch 112 to stop the operation of the pumping unit 52.

Folowing the brewing of coffee in one container unit 50, the arm 94 may be swung to the other container unit. When plunger 210 is cammed out of detent 206, the switch 112 is opened and the pumping unit 52 is again incapable of operating. The plunger 210 is urged past detent 208 and into the other detent 206 where switch 112 is again set to be finally closed by meter switch 106.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the appended claims so as to embrace any and all equivalent devices.

What is claimed is:

1. A machine for preparing beverages which comprises: a vessel adapted to contain a quantity of relatively hot water; a prepared beverage container means adapted to have disposed therein material from which the beverage is prepared; automatic pumping equipment communicating with said vessel which includes a reservoir to which an excess of hot water from said vessel is pumped to provide a constant water head and from which said water is delivered by gravity feed to the container means wherein the water gravity flows through the material to provide a beverage; an automatic timing device connected to said pumping equipment which actuates the pump so that an excess of hot water is pumped from the vessel to the reservoir for a predetermined time and in a quantity sufficient to maintain the constant head of water in the reservoir, and thereby to determine the quantity of said relatively hot water delivered to said container means for providing uniformity of flavor and aroma of the prepared beverage; and means for returning excess water pumped to said reservoir to the vessel.

2. A machine for preparing beverages according to claim 1 wherein the pumping equipment includes a propeller immersed in said hot water which has an operating speed for pumping water to said reservoir which exceeds the delivery speed of the water from the reservoir.

3. A machine for preparing beverages according to claim 1 wherein said pumping equipment includes a column, a portion thereof being immersed in the relatively hot water of the vessel, and disposed within the column is a water supply conduit, and an element for forcing water from said vessel through the supply conduit and into the reservoir, and said last mentioned means includes openings in said column which are in communication with said reservoir and through which water in said reservoir passes to be returned to said vessel through said column.

4. A machine for preparing beverages according to claim 1 wherein said reservoir is above said vessel.

5. A machine for preparing beverages which comprises: a vessel adapted to contain a quantity of water; a prepared beverage container means supported by said vessel and having disposed therein material from which the beverage is prepared; automatic pumping equipment communicating with and supported by said vessel which includes a reservoir to which water from said vessel is pumped and from which water is delivered to the container means wherein the water circulates through the material to provide a beverage; and an automatic timing device connected to said pumping equipment which actuates the pump so that water is pumped to the reservoir from the vessel at a predetermined time and in a sufficient quantity to maintain a constant head of water in the reservoir, and thereby to determine the quantity of water delivered to said container means for providing uniformity of flavor and aroma of the prepared beverage.

6. A machine for preparing beverages according to claim 5, wherein said container means embodies a plurality of nested containers each of which is supported by, and removable from, the container in circumscribing relationship thereto and all of which are removable from the vessel.

7. A machine for preparing beverages according to claim 5, wherein said container means includes an element for dispersing the water in a spray over said material to provide a thorough circuation of the water through the material.

8. A machine for preparing beverages according to claim 5, wherein the reservoir of said pumping equipment embodies a first element for returning an excess of water to the vessel and a second element for draining said reservoir and returning the drain water to the vessel.

9. A machine for preparing beverages according to claim 5, wherein said pumping equipment includes a column, a portion thereof being immersed in the water of the vessel, and disposed within the column is a water supply conduit and means for forcing water from said vessel through the supply conduit and into the reservoir.

10. A machine for preparing beverages according to claim 9, wherein said means embodies a motor-driven propeller immersed in the water of the vessel.

11. A machine for preparing beverages which comprises: a vessel containing a quantity of heated water; a plurality of spaced, prepared beverage container means removably supported by said vessel, each of said container means having disposed therein material from which the beverage is prepared by circulating water therethrough, and each of said container means includes a central opening therein that represents a point on an arc; automatic pumping equipment removably supported in rotatable relationship on said vessel and being partially immersed in said water; said pumping equipment embodying a reservoir to which water from said vessel is pumped and from which water is delivered, said pumping equipment further embodying an arm pivotal through an arc of travel; a water delivery tube disposed in said arm which is in communication with said reservoir to receive the water delivered therefrom and which includes a discharge end registrable with the openings in said container means; an automatic timing device connected to said pumping equipment which actuates the pumping equipment so that water is pumped to the reservoir from the vessel at a predetermined time and in a quantity sufficient to maintain a constant head of water in the reservoir thereby providing uniformity of flavor and aroma of the prepared beverage; and a safety control element connected to said pumping equipment which prevents operation of said pumping equipment when the discharge end of said delivery tube is out of registration with said openings.

12. A machine for preparing beverages according to claim 11, wherein said safety control element includes a switch-actuating plunger and a plurality of detents adapted to receive said plunger to position the delivery tube between a first position wherein the discharge end of said delivery tube is in registration with said openings in said container means and said pumping equipment is rendered operable, and a second position wherein the discharge end of said delivery tube is located intermediate the openings in said container means and said pumping equipment is rendered inoperable.

13. A machine for preparing beverages according to claim 11, wherein said safety control element includes a cam block and a switch-actuating plunger which rotates with said pumping equipment and rides over a cam surface of said cam block to cause the pumping equipment to become operable when the plunger is in one position and to cause the pumping equipment to become inoperable when the plunger is in another position.

14. A machine for preparing beverages according to claim 11, wherein said safety control element includes a cam block having the configuration of a segment of a circle and embodying a surface having a simple, continuous, convex curve with a crown, and a switch-actuating plunger which rotates with said pumping equipment and rides over the cam surface whereby when the plunger is at the crown of the cam block the pumping equipment is inoperable and when the plunger is at substantially the extreme on either side of the crown the pumping equipment is operable.

15. A machine for preparing beverages according to claim 14, wherein the surface of said cam block includes a plurality of plunger-receiving detents whereby when the discharge end of said delivery tube is in registration with the opening in one of said container means, the plunger is received in one of said detents to close the switch and cause said pumping equipment to be operable, and when the discharge end of said delivery tube is substantially midway between a pair of container means, the plunger is received in a detent disposed in the crown of said cam block to open the switch and cause said pumping equipment to be inoperable.

16. A machine for preparing beverages according to claim 11, wherein said container means includes a plurality of nested containers, the centralmost container being a porous bag having the material disposed therein and which is removably supported by a first encircling container and a plurality of rods, the first encircling container in turn being removably supported by rods of a second encircling container, and the second encircling container being supported by rods of a kettle which is removably supported by said vessel and which has a portion thereof immersed in the water of the vessel.

17. A machine for preparing coffee which comprises: a vessel containing a quantity of heated water; a plurality of spaced, prepared coffee container means removably supported by said vessel, each of said container means having disposed therein ground coffee from which the coffee is prepared by circulating water therethrough, and each of said container means includes a central opening therein that represents a point on an arc; automatic pumping equipment removably supported in rotatable relationship on said vessel and being partially immersed in said water; said pumping equipment embodying a reservoir to which water from said vessel is pumped and from which water is delivered, said pumping equipment further embodying an arm pivotal through an arc of travel; a water delivery tube disposed in said arm which is in communication with said reservoir to receive the water delivered therefrom and which includes a discharge end registrable with the openings in said container means; an automatic timing device connected to said pumping equipment which actuates said pumping equipment so that water is pumped from the vessel to the reservoir for a predetermined time and in sufficient quantity to maintain a constant head of water in the reservoir thereby providing uniformity of flavor and aroma of the prepared coffee; valve means connected to each of said container means for withdrawing prepared coffee from said container means; and aeration facilities connected to and operatively communicating with each of said valve means for aerating the prepared coffee as it is withdrawn from the container means to enhance the flavor and aroma thereof.

18. A machine for preparing coffee according to claim 17, wherein said aeration facilities include an air compressor and conduits extending from said air compressor to each valve means.

19. A machine for preparing coffee according to claim 17, wherein said safety control element is in series with said automatic timing device.

20. A machine for preparing coffee according to claim 17, wherein said vessel includes a compartment having a burner therein employed to heat the water in said vessel.

21. A machine for preparing beverages which comprises: supporting structure, a vessel on said supporting structure adapted to contain a quantity of hot water, receptacle means mounted on said supporting structure and adapted to have disposed therein material from which the beverage is prepared, a reservoir on said supporting structure and disposed at a higher elevation than said receptacle means, means for transferring a measured amount of hot water from said vessel to said reservoir, and a gravity flow conduit extending from said reservoir and opening above said receptacle means for delivering said measured amount of hot water by gravity feed from said reservoir to said receptacle means wherein the water gravity flows through the material to provide the beverage, said gravity flow conduit restricting the flow of hot water to a rate which is slower than the rate of transfer of said measured amount of hot water from said vessel to said reservoir, whereby the rate of flow of the hot water from said reservoir to said receptacle means is determined entirely by said gravity flow conduit and is independent of the rate of transfer of the hot water from said vessel to said reservoir, said vessel being disposed at a lower elevation than said reservoir, said transferring means including a motor driven pump and switching means connected to the pump for controlling the amount of hot water transferred by the pump from said vessel to said reservoir.

References Cited by the Examiner
UNITED STATES PATENTS

| | | |
|---|---|---|
| 1,995,671 | 3/1935 | Dashner. |
| 2,146,468 | 2/1939 | Doolan _____ 200—153.11 X |
| 2,748,689 | 6/1956 | Rotman _____ 99—283 X |
| 2,843,048 | 7/1958 | Tapp _____ 222—385 X |
| 2,862,440 | 12/1958 | Oakes _____ 99—282 |
| 3,085,880 | 4/1963 | Matty _____ 99—283 X |
| 3,087,415 | 4/1963 | Kaplan et al. _____ 99—283 X |
| 3,126,812 | 3/1964 | Nau _____ 99—283 |

WALTER A. SCHEEL, *Primary Examiner.*

JEROME SCHNALL, *Examiner.*

S. P. FISHER, *Assistant Examiner.*